(12) United States Patent
Sun (10) Patent No.: US 11,465,876 B2
(45) Date of Patent: Oct. 11, 2022

(54) MULTI-FUNCTIONAL WINDING ROLL

(71) Applicant: SHANGHAI EASY-USE TOOLS ENTERPRISE CO., LTD, Shanghai (CN)

(72) Inventor: Shiyu Sun, Shanghai (CN)

(73) Assignee: SHANGHAI EASY-USE TOOLS ENTERPRISE CO., LTD, Shanghai (CN)

( * ) Notice: Subject to any disclaimer, the term of this patent is extended or adjusted under 35 U.S.C. 154(b) by 422 days.

(21) Appl. No.: 16/497,656

(22) PCT Filed: Jan. 18, 2018

(86) PCT No.: PCT/CN2018/073293
§ 371 (c)(1),
(2) Date: Jan. 7, 2020

(87) PCT Pub. No.: WO2018/218975
PCT Pub. Date: Dec. 6, 2018

(65) Prior Publication Data
US 2020/0198926 A1    Jun. 25, 2020

(30) Foreign Application Priority Data
May 27, 2017 (CN) .......................... 201720609063.6

(51) Int. Cl.
*B65H 75/40* (2006.01)
*B65H 75/44* (2006.01)

(52) U.S. Cl.
CPC ............. *B65H 75/40* (2013.01); *B65H 75/44* (2013.01); *B65H 2701/34* (2013.01)

(58) Field of Classification Search
CPC .... B65H 75/40; B65H 75/44; B65H 2701/34; B65H 2701/533; B65H 75/4471; H02G 11/02
(Continued)

(56) References Cited

U.S. PATENT DOCUMENTS 3,369,084 A * 2/1968 Cook ..................... B65H 75/40
                                            191/12.4
3,870,133 A * 3/1975 Brennenstuhl ......... H02G 11/02
                                            191/12.4
(Continued)

FOREIGN PATENT DOCUMENTS

CN    2092529 U    1/1992
CN    2882028 Y    3/2007
(Continued)

OTHER PUBLICATIONS

International Search Report from corresponding PCT Application No. PCT/CN2018/073293, dated Apr. 18, 2018.

*Primary Examiner* — William A. Rivera
(74) *Attorney, Agent, or Firm* — Harness, Dickey & Pierce, P.L.C.

(57) ABSTRACT

A multi-functional winding roll, comprising: a housing (4), the housing having a cuboid hollow structure, circular openings (61, 62) being provided on a front panel (41) of the housing and a rear panel (42) of the housing respectively, rectangular openings (63, 64) being provided on a left panel (43) of the housing and a right panel (44) of the housing respectively; a grip (2), both ends of the grip being rotatably connected to an upper panel (45) of the housing, an elongated groove (8) being provided at the upper portion of the grip; a work lamp (1), the work lamp being provided inside the elongated groove; a roller (11), the roller being provided inside the housing; a socket (5), the socket being fixed inside the roller; and a box cover (10), the box cover fitting the end of the roller which is close to the rear panel.

9 Claims, 7 Drawing Sheets

(58) Field of Classification Search
USPC .......................................... 191/12.2 R, 12.4
See application file for complete search history.

(56) References Cited

U.S. PATENT DOCUMENTS

| | | | | |
|---|---|---|---|---|
| 4,520,239 | A * | 5/1985 | Schwartz | H02G 11/02 |
| | | | | 242/402 |
| 4,725,697 | A * | 2/1988 | Kovacik | H02G 11/02 |
| | | | | 191/12.4 |
| 5,657,841 | A * | 8/1997 | Morvan | H02G 11/02 |
| | | | | 439/501 |
| 2006/0118377 | A1* | 6/2006 | Lai | H02G 11/02 |
| | | | | 191/12.4 |
| 2008/0111013 | A1* | 5/2008 | Suckle | B65H 75/4468 |
| | | | | 242/370 |
| 2008/0197226 | A1* | 8/2008 | Cooper | B65H 75/4471 |
| | | | | 242/370 |
| 2014/0339039 | A1* | 11/2014 | Ono | H02G 11/02 |
| | | | | 191/12.4 |
| 2021/0163255 | A1* | 6/2021 | Miller | B65H 75/4494 |

FOREIGN PATENT DOCUMENTS

| | | | |
|---|---|---|---|
| CN | 201447273 | U | 5/2010 |
| CN | 105565087 | A | 5/2016 |
| CN | 205380649 | U | 7/2016 |
| GB | 2108929 | A | 5/1983 |
| GB | 2529164 | * | 2/2016 |
| JP | S5617873 | A | 2/1981 |

\* cited by examiner

MULTI-FUNCTIONAL WINDING ROLL

CROSS-REFERENCE TO RELATED APPLICATIONS

This application is a national phase entry of PCT/CN2018/073293, filed on Jan. 18, 2018, which claims priority to and the benefit of Chinese Patent Application No. CN 201720609063.6, filed on May 27, 2017, the entire contents of which are incorporated herein by references.

FIELD

The invention relates to the field of winding rolls, and more particularly, to a multi-functional winding roll.

BACKGROUND

Winding rolls, a device for storing power line, are widely used in various constructions. Generally, the existing winding roll is simple in structure, and it is only used for collecting power line. In addition, when it comes to more practical winding roll, some changes are made in terms of its winding method only, and it is inconvenient to operate in dark environment. It should be mentioned that the existing winding roll is generally not provided with a device for storing small items, therefore, it is not easy to store small tools therein.

SUMMARY

Aiming at the foregoing problems exist in the prior art, the present invention aims to provide a multi-functional winding roll.

To achieve the above-mentioned purposes, the technical solution adopted in the present invention is provided below:

A multi-functional winding roll, comprising: a housing, the housing having a cuboid hollow structure, circular openings being provided on a front panel of the housing and a rear panel of the housing respectively, rectangular openings being provided on a left panel of the housing and a right panel of the housing respectively; a grip, the grip being in a "Π" shape, both ends of the grip being rotatably connected to an upper panel of the housing, and an elongated groove being provided at the upper portion of the grip; a work lamp, the work lamp being provided inside the elongated groove, the work lamp being rotatably connected to the elongated groove; a roller, the roller being provided inside the housing, the roller being a hollow structure with openings at both ends, one end of the roller being rotatably connected to the circular opening of the rear panel, the other end of the roller being rotatably connected to the circular opening of the front panel; a socket, the socket being fixed inside the roller, the socket being provided on a side of the roller which is close to the front panel, a barrier being provided on a side of the roller which is close to the rear panel; and a box cover, the box cover fitting the end of the roller which is close to the rear panel, the box cover, the barrier and the roller forming an enclosed cavity.

In the above-mentioned multi-functional winding roll, wherein a circular hole is provided on a side of the roller which is close to the socket, power line of the socket passes through the circular hole and winds around the roller, and the power line is electrically connected to the socket.

In the above-mentioned multi-functional winding roll, wherein one end of the roller, which is close to the front panel, is extended outward to form an annular projection, and a handle is fixed on the annular projection.

In the above-mentioned multi-functional winding roll, wherein a first circular groove is formed around an outer edge of one end of the roller which is close to the rear panel, the first circular groove snaps into the circular opening of the rear panel; a second circular groove is formed around an outer edge of the annular projection, the second circular groove snaps into the circular opening of the front panel.

In the above-mentioned multi-functional winding roll, wherein the first circular groove is rotatably connected to the circular opening of the rear panel, and the second circular groove is rotatably connected to the circular opening of the front panel.

In the above-mentioned multi-functional winding roll, wherein a U-shaped groove is formed in the upper panel, and the U-shaped groove fits the grip.

In the above-mentioned multi-functional winding roll, wherein arc-shaped openings are provided at a front side and a rear side of the elongated groove respectively, the two arc-shaped openings are symmetrical with respect to the work lamp.

In the above-mentioned multi-functional winding roll, wherein the work lamp is detachably connected to the elongated groove.

In the above-mentioned multi-functional winding roll, wherein a tool box is provided at a side of the upper panel, the tool box is integratedly connected with the upper panel, and the tool box fits a tool box cover.

By adopting the above-mentioned technical solution, the present invention may present the following advantages over the prior art.

1. In the multi-functional winding roll, the socket is provided on the roller, power line may be wound around the roller and may be electrically connected to the socket. In this way, it is easier to wind the power line, making it more practicable in practice.

2. Addition of the work lamp and the storage box to the winding roll makes it possible to enable an operator to use the winding roll in the dark environment without additional light source. Furthermore, work environment is improved, and many small items may be stored in the winding roll.

BRIEF DESCRIPTION OF THE DRAWINGS

The accompanying drawings, together with the specification, illustrate exemplary embodiments of the present disclosure, and, together with the description, serve to explain the principles of the present invention.

In the accompanying drawings: 1. work lamp; 2. grip; 3. tool box; 4. housing; 41. front panel; 42. rear panel; 43. left panel; 44. right panel; 45. upper panel; 5. socket; 61. circular opening of the front panel; 62. circular opening of the rear panel; 63. rectangular opening of the left panel; 64 rectangular opening of the right panel; 7. annular projection; 8. elongated groove; 9. handle; 10. box cover; 11. roller; 12. U-shaped groove; 13. arc-shape opening; 141. first circular groove; 142. second circular groove; 15. circular hole; 16. tool box cover; 17. power line.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

Figure 1:
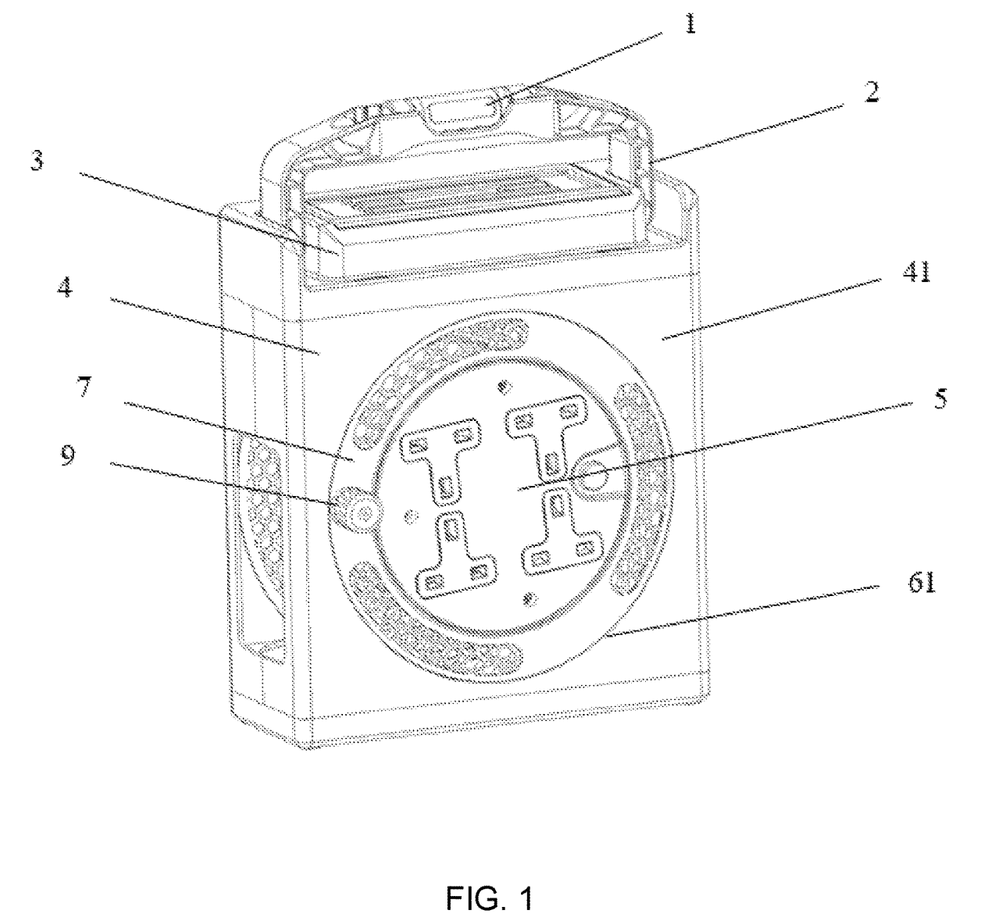
FIG. 1 is a front view of a multi-functional winding roll according to the present invention.
Figure 2:
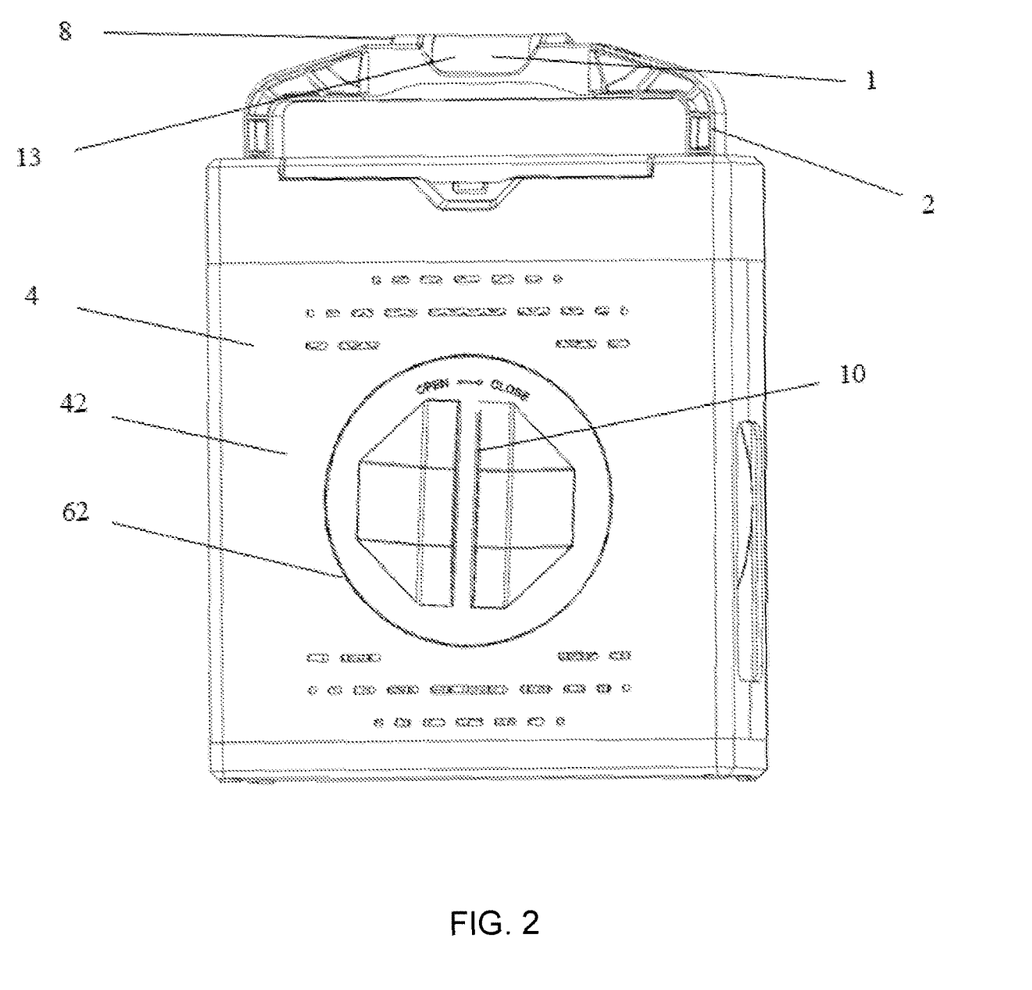
FIG. 2 is a rear view of a multi-functional winding roll according to the present invention.
Figure 3:
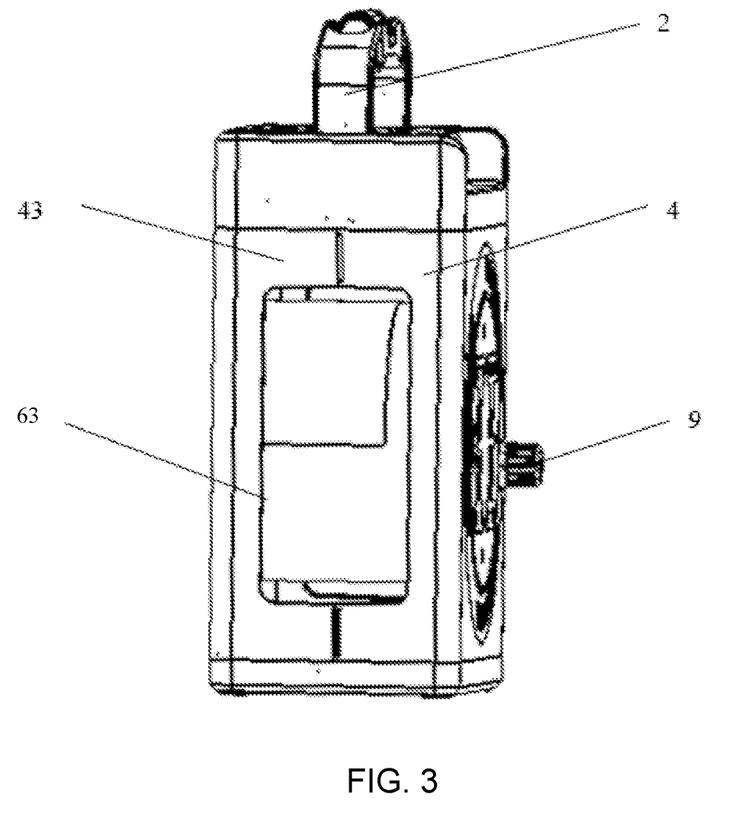
FIG. 3 is a left side view of a multi-functional winding roll according to the present invention.
Figure 4:
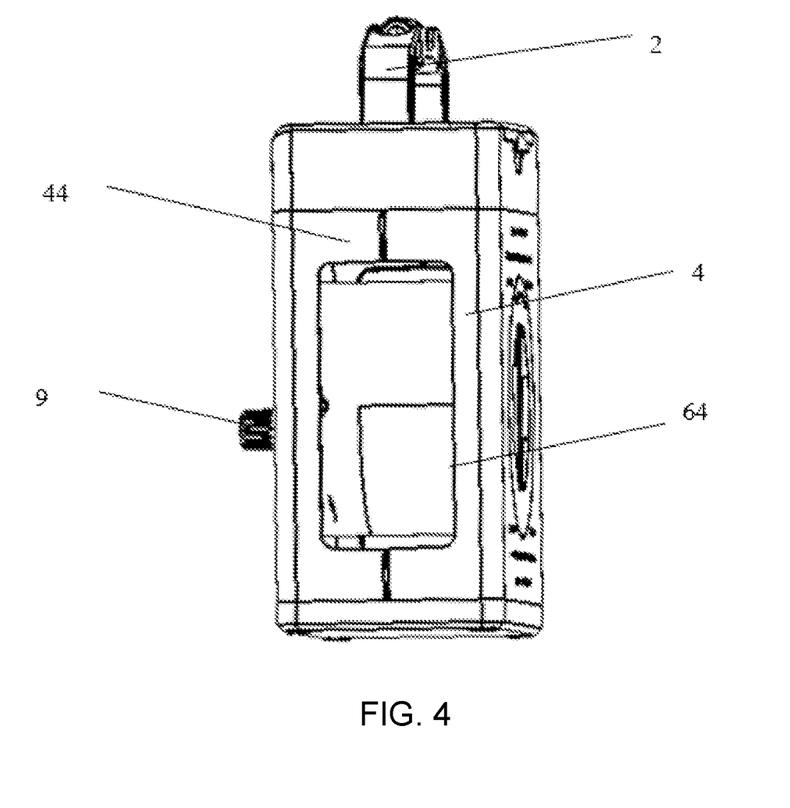
FIG. 4 is a right side view of a multi-functional winding roll according to the present invention.

FIG. 1 is a front view of a multi-functional winding roll according to the present invention, FIG. 2 is a rear view of a multi-functional winding roll according to the present invention, FIG. 3 is a left side view of a multi-functional winding roll according to the present invention, and FIG. 4 is a right side view of a multi-functional winding roll according to the present invention. With reference to FIGS. 1 to 4, a preferred embodiment of a multi-functional winding roll is shown, wherein the multi-functional winding roll comprises: a housing 4, the housing 4 having a cuboid hollow structure, circular openings 61, 62 being provided on a front panel 41 of the housing 4 and a rear panel 42 of the housing 4 respectively, rectangular openings being provided on a left panel 43 of the housing 4 and a right panel 44 of the housing 4 respectively.

Figure 5:
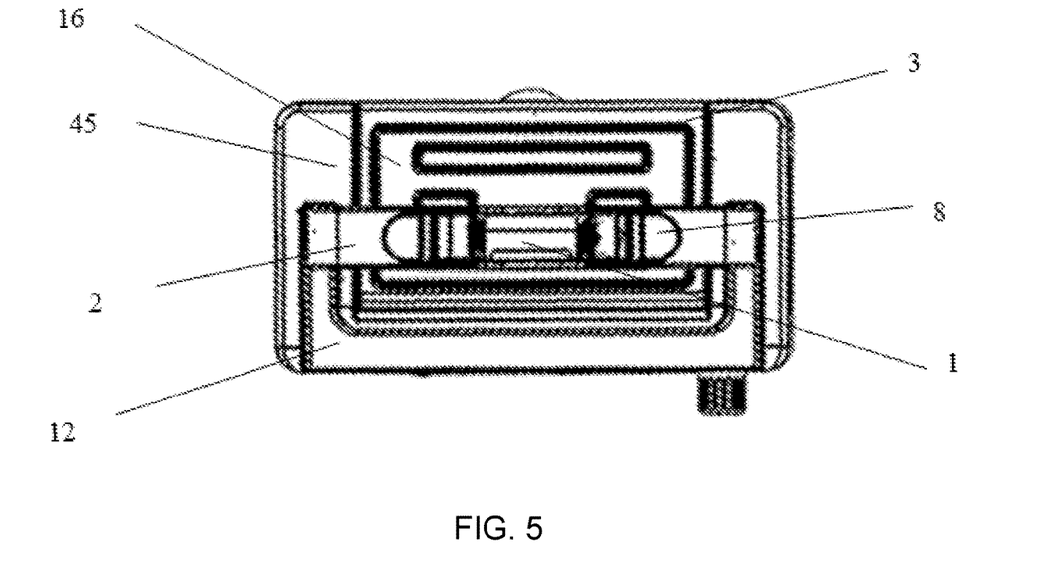
FIG. 5 is a top view of a multi-functional winding roll according to the present invention.

FIG. 5 is a top view of a multi-functional winding roll according to the present invention.

Furthermore, as a preferred embodiment, the multi-functional winding roll further comprises: a grip 2, the grip 2 being in an "Π" shape, both ends of the grip 2 being rotatably connected to an upper panel 45 of the housing 4, and an elongated groove 8 being provided at the upper portion of the grip 2, through which the multi-functional winding roll may be lifted up.

In addition, as a preferred embodiment, the multi-functional winding roll further comprises: a work lamp 1, the work lamp 1 being provided inside the elongated groove 8, the work lamp 1 being rotatably connected to the elongated groove 8.

Figure 6:
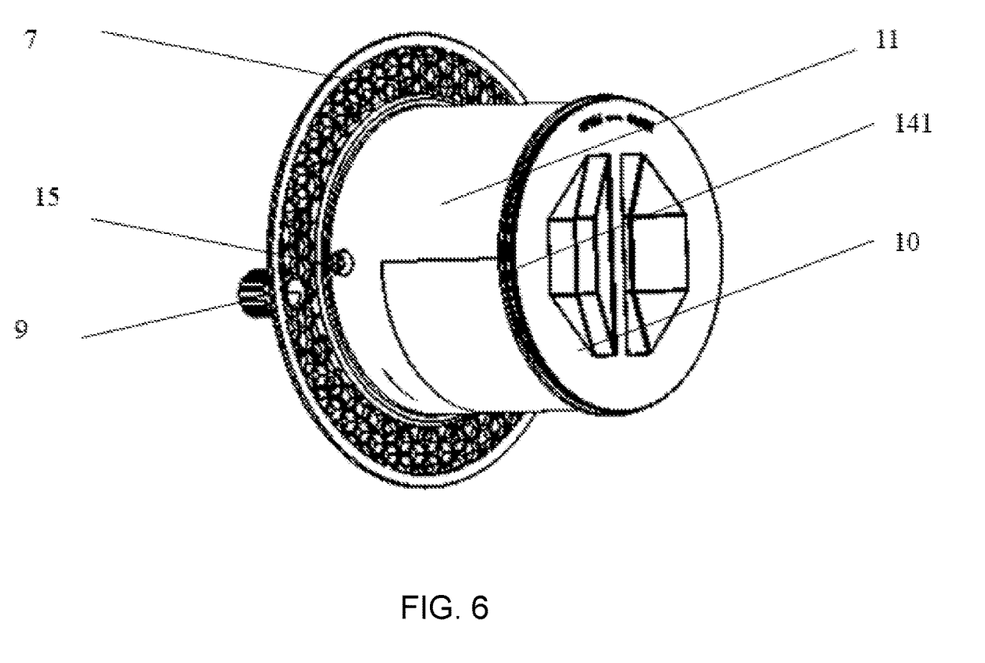
FIG. 6 is a schematic view of a roller of the multi-functional winding roll according to the present invention.
Figure 7:
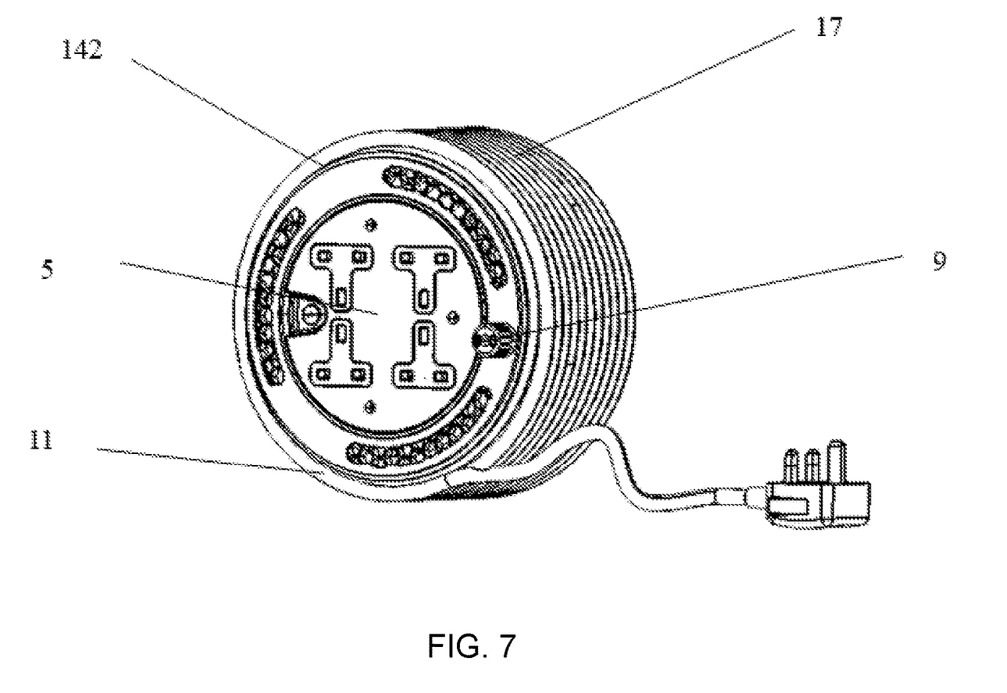
FIG. 7 is a schematic view of the roller and power line of the multi-functional winding roll according to the present invention.

FIG. 6 is a schematic view of a roller of the multi-functional winding roll according to the present invention, and FIG. 7 is a schematic view of the roller and power line of the multi-functional winding roll according to the present invention.

Furthermore, as a preferred embodiment, the multi-functional winding roll further comprises: a roller 11, the roller 11 being provided inside the housing 4, the roller 11 being a hollow structure with openings at both ends, one end of the roller 11 being rotatably connected to the circular opening 62 of the rear panel, the other end of the roller 11 being rotatably connected to the circular opening 61 of the front panel, and the power line 17 may be wound around the roller 11.

Furthermore, as a preferred embodiment, with reference to FIGS. 1 and 7, the multi-functional winding roll further comprises: a socket 5, the socket 5 being fixed inside the roller 11, the socket 5 being provided on a side of the roller 11 which is close to the front panel 41, a barrier (not shown in Figures) being provided on a side of the socket 5 which is close to the rear panel 42.

Furthermore, as a preferred embodiment, with reference to FIG. 6, the multi-functional winding roll further comprises: a box cover 10, the box cover 10 fitting the end of the roller 11 which is close to the rear panel 42, the box cover 10, the barrier (not shown in Figures) and the roller 11 form an enclosed cavity which is used for storing articles.

Furthermore, as a preferred embodiment, a circular hole 15 is provided on a side of the roller 11 which is close to the socket 5, power line 17 of the socket 5 passes through the circular hole 15 and winds around the roller 11, and the power line 17 is electrically connected to the socket 5.

Furthermore, as a preferred embodiment, one end of the roller 11, which is close to the front panel 41, is extended outward to form an annular projection 7, and a handle 9 is fixed on the annular projection 7; the handle 9 is rotated around an axis of the roller 11, and the roller 11 is rotated together with the handle 9, such that the power line is wound around the roller 11.

Furthermore, as a preferred embodiment, a first circular groove 141 is formed at an end of the roller 11 which is close to the rear panel 42, the first circular groove 141 snaps into the circular opening 62 of the rear panel, a second circular groove 142 is provided on the annular projection 7, and the second circular groove 142 snaps into the circular opening 61 of the front panel.

Furthermore, as a preferred embodiment, the first circular groove 141 is rotatably connected to the circular opening 62 of the rear panel, and the second circular groove 142 is rotatably connected to the circular opening 61 of the front panel.

The foregoing is only the preferred embodiments of the invention, not thus limiting embodiments and scope of the invention.

The present invention also has the following embodiments based on the above-mentioned embodiments:

In a further embodiment of the present invention, with reference to FIG. 5, a U-shaped groove 12 is formed in the upper panel 45, the U-shaped groove 12 fits the grip 2, the grip 2 is rotatably disposed inside the U-shaped groove 12, such that the grip 2 is flush with the upper panel 45, and space is saved a lot.

In a further embodiment of the present invention, arc-shaped openings 13 are provided at a front side and a rear side of the elongated groove 8 respectively, the two arc-shaped openings 13 are symmetrical with respect to the work lamp 1. Therefore, light from the work lamp 1 may pass through the arc-shaped openings 13 located on the two sides, serving as the function of illuminating the socket 5 and the box cover 10. It makes it possible for the operator to use the winding roll in the dark environment without additional light source, and work environment is improved.

In a further embodiment of the present invention, the work lamp 1 is detachably connected to the elongated groove 8.

In a further embodiment of the present invention, a tool box 3 is provided at a side of the upper panel 45, the tool box 3 is integratedly connected with the upper panel 45, and the tool box 3 fits a tool box cover 16.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A multi-functional winding roll, comprising:
   a housing, the housing having a cuboid hollow structure, circular openings being provided on a front panel of the housing and a rear panel of the housing respectively, rectangular openings being provided on a left panel of the housing and a right panel of the housing respectively;
   a grip, the grip being in an " "Π" " shape, both ends of the grip being rotatably connected to an upper panel of the housing, and an elongated groove being provided at the upper portion of the grip;
   a work lamp, the work lamp being provided inside the elongated groove, the work lamp being rotatably connected to the elongated groove;
   a roller, the roller being provided inside the housing, the roller being a hollow structure with openings at both ends, one end of the roller being rotatably connected to the circular opening of the rear panel, the other end of the roller being rotatably connected to the circular opening of the front panel;
   a socket, the socket being fixed inside the roller, the socket being provided on a side of the roller which is close to the front panel; and
   a box cover, the box cover fitting the end of the roller which is close to the rear panel.

2. The multi-functional winding roll of claim 1, wherein a circular hole is provided on a side of the roller which is close to the socket, power line of the socket passes through the circular hole and winds around the roller, and the power line is electrically connected to the socket.

3. The multi-functional winding roll of claim 1, wherein, one end of the roller, which is close to the front panel, is extended outward to form an annular projection, and a handle is fixed on the annular projection.

4. The multi-functional winding roll of claim 3, wherein a first circular groove is formed around an outer edge of one end of the roller which is close to the rear panel, the first circular groove snaps into the circular opening of the rear panel; a second circular groove is formed around an outer edge of the annular projection, the second circular groove snaps into the circular opening of the front panel.

5. The multi-functional winding roll of claim 4, wherein the first circular groove is rotatably connected to the circular opening of the rear panel, and the second circular groove is rotatably connected to the circular opening of the front panel.

6. The multi-functional winding roller of claim 1, wherein a U-shaped groove is formed in the upper panel, and the U-shaped groove fits the grip.

7. The multi-functional winding roller of claim 1, wherein arc-shaped openings are provided at a front side and a rear side of the elongated groove respectively, the two arc-shaped openings are symmetrical with respect to the work lamp.

8. The multi-functional winding roller of claim 1, wherein the work lamp is detachably connected to the elongated groove.

9. The multi-functional winding roller of claim 1, wherein a tool box is provided at a side of the upper panel, the tool box is integratedly connected with the upper panel, and the tool box fits a tool box cover.

* * * * *